(12) United States Patent
Czarnecki et al.

(10) Patent No.: US 7,724,459 B2
(45) Date of Patent: *May 25, 2010

(54) METHOD FOR READING DATA FROM A MAGNETIC RECORDIGN TAPE

(75) Inventors: W. Stanley Czarnecki, Palo Alto, CA (US); Icko E. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,452

(22) Filed: Sep. 5, 2008

(65) Prior Publication Data

US 2008/0316632 A1  Dec. 25, 2008

Related U.S. Application Data

(63) Continuation of application No. 11/216,615, filed on Aug. 30, 2005, now Pat. No. 7,474,488.

(51) Int. Cl.
*G11B 15/12* (2006.01)
*G11B 5/58* (2006.01)

(52) U.S. Cl. .................................. 360/63; 360/77.01
(58) Field of Classification Search ................ None
See application file for complete search history.

(56) References Cited

U.S. PATENT DOCUMENTS

| | | | | |
|---|---|---|---|---|
| 4,298,897 A | 11/1981 | Arter et al. | ................ | 360/39 |
| 4,729,048 A | 3/1988 | Imakoshi et al. | .......... | 360/234.7 |
| 4,903,150 A | 2/1990 | Juso et al. | ................ | 360/77.12 |
| 5,107,381 A | 4/1992 | Mitsuhashi et al. | ........... | 360/70 |
| 5,289,328 A | 2/1994 | Saliba | ................ | 360/121 |
| 5,392,170 A | 2/1995 | Solhjell | ................ | 360/63 |
| 5,432,652 A | 7/1995 | Comeaux et al. | .......... | 360/77.12 |
| 5,448,430 A | 9/1995 | Bailey et al. | .............. | 360/77.12 |
| 5,452,152 A | 9/1995 | Rudi | ................ | 360/77.12 |
| 5,574,602 A | 11/1996 | Baca et al. | ................ | 360/77.12 |

(Continued)

OTHER PUBLICATIONS

Kurtas et al., Reduced Complexity Maximum Likelihood Sequence Estimation for Multitrack High-Density magnetic Recording Channels IEEE Transactions on Magnetics, vol. 35, No. 4, Jul. 1999.

(Continued)

*Primary Examiner*—K. Wong
(74) *Attorney, Agent, or Firm*—Zilka-Kotab, PC

(57) ABSTRACT

A method for reading data from a magnetic recording tape having multiple adjacent data tracks according to one embodiment includes simultaneously detecting signals from a plurality of read devices, at least some of the read devices being positioned over multiple data tracks while other of the adjacent read devices are positioned over single data tracks; determining which of the read devices is positioned over a single data track; and simultaneously reading data from the data tracks using only those read devices over the single data tracks. A method for reading and writing data to a magnetic recording tape according to another embodiment includes simultaneously writing data tracks to a magnetic medium; and simultaneously reading the data tracks on the magnetic medium using a plurality of adjacent read devices; wherein the number of the adjacent read devices is at least twice the number of the adjacent write devices.

11 Claims, 5 Drawing Sheets

U.S. PATENT DOCUMENTS

| | | | | |
|---|---|---|---|---|
| 5,629,813 | A | 5/1997 | Baca et al. | 360/77.12 |
| 5,898,534 | A | 4/1999 | Gray | 360/77.01 |
| 6,104,556 | A | 8/2000 | Schaenzer | 360/25 |
| 6,141,174 | A | 10/2000 | Judge et al. | 360/76 |
| 6,236,525 | B1 | 5/2001 | Cates et al. | 360/51 |
| 6,330,123 | B1 | 12/2001 | Schwarz et al. | 360/75 |
| 6,496,328 | B1 | 12/2002 | Dugas | 360/121 |
| 6,650,496 | B2 | 11/2003 | Nozieres et al. | 360/63 |
| 7,092,200 | B2 | 8/2006 | Kitahara | 360/77.12 |
| 7,095,582 | B2 | 8/2006 | Kitahara | 360/77.12 |
| 7,106,549 | B2 | 9/2006 | Asakura | 360/77.06 |
| 7,253,986 | B2 | 8/2007 | Berman et al. | 360/77.01 |
| 7,474,488 | B2 | 1/2009 | Czarnecki et al. | 360/63 |
| 7,570,450 | B2 * | 8/2009 | Koeppe | 360/75 |
| 2002/0071198 | A1 | 6/2002 | Liu et al. | 360/77.02 |
| 2007/0047123 | A1 | 3/2007 | Czarnecki et al. | 360/55 |
| 2007/0165326 | A1 | 7/2007 | Berman et al. | 360/77.12 |

OTHER PUBLICATIONS

Gyun Roh et al. "Ringle-Head/Single-Track Detection in Interfering Tracks" IEEE Transactions on Magnetics, vol. 38, No. 4, Jul. 2002.

Kato et al., "Two-Dimensional Run-Length-Limited Code and Partial Response Maximum Likelihood System with Mulut-Track Recording" WP.23, IEEE 2002.

Kumar et al., "Two-Dimensional Equalization: Theory and Applications to High Density Magnetic Recording" IEEE Transactions on Communications, vol. 42, No. 2/3/4, Feb./Mar./Apr. 1994.

Soljanin et al., "Multihead Detection for Multitrack Recording Channels" IEEE Transactions on Information Theory, vol. 44, No. 7, Nov. 1998.

Immink et al., "Signal Processing and Coding for Two-Dimensional Optical Storage" 2003.

Ahmed et al., "Track Squeeze Using Adaptive Intertrack Interference Equalization" IEEE Transactions on Magnetics, vol. 38, No. 5, Sep. 2002.

Voois et al., "Upper Bound on Achievable Storage Density: A Two-Dimentional Approach" IEEE Transactions on Magnetics, vol. 33, No. 1, Jan. 1997.

Voois et al., "Multichannel Signal Processing for Multiple-Head Digital Magnetic Recording" IEEE Transactions on Magnetics, vol. 30, No. 6, Nov. 1994.

Vea et al., "Magnetic Recording Channel Model with Intertrack Interference" DSSC, Depart. Elect. And Comp. Eng., Carnegie Mellon University, Pittsburgh, PA, 15213, IEEE 1994.

Singla et al, "Iteratice Decoding and Equalization for 2-d Recording Channels" IEEE Transactions on Magnetics, vol. 38, No. 5, Sep. 2002.

Barbosa, Lineu C., "Simultaneous Detection of Readback Signals form Interfering Magnetic Recording Tracks Using Array Heads" IEEE Transactions on Magnetics, vol. 26, No. 5, Sep. 1990.

Steele II et al., "Multi-Tapped Magentoresistive Heads for Magnetic Tape tracking Servo" IEEE Transactions on Magnetics, vol. 34, No. 4, Jul. 1998.

Barbosa et al., "Array Heads for Estimating track Misregistration" IEEE Transactions on Magnetics, vol. 29, No. 6, Nov. 1993.

Bain et al., "Limitations to Track Following Iposed by Position Error Signal SNR Using a Multi-Tapped Magnetoresistive Servo Head" IEEE Transactions on Magnetics, vol. 35, No. 2, Mar. 1999.

Davey et al., "Two-Dimensional Coding for a Multi-Track Recording System to Comabt Inter-Track Interference" IEEE Transactions on Magentics, vol. 34, Np. 4, Jul. 1998.

Voois et al, "Multichannel Digital Magnetic Recording" Information Systems Laboratory, Stanford University, Stanford, CA. 94305, IEEE 1992.

Voois et al, "A Decision Feedback Equalizer for Multiple-Head Digital Magnetic Recording" Information Systems Laboratory, Stanford University, Stanford, CA. 94305, IEEE 1991.

Vea et al, "Multichannel Equalization for High Track Densisty Magnetic Recording" IEEE, 1994.

Bellini et al., "Nonlinear Cross Talk Cancellation for High Density Optical Recording" Global Telecommunications Conference—Globecom, IEEE 1999.

Abbott et al., "Performance of Digital Magnetic Recording with Equalization and Offtrack Interference" IEEE Transactions on Magentics, vol. 27, No. 1, Jan. 1991.

Office Action Summary from U.S. Appl. No. 11/215,602 mailed on Aug. 7, 2006.

Office Action Summary from U.S. Appl. No. 11/216,615 mailed on Aug. 7, 2006.

U.S. Application No. 11/216,615 filed on Aug. 30, 2005.

Final Office Action Summary from U.S. Appl. No. 11/215,602 mailed on Jan. 16, 2007.

Notice of Allowance from U.S. Appl. No. 11/215,602 mailed on Apr. 4, 2007.

Office Action Summary from U.S. Appl. No. 11/216,615 mailed on Feb. 16, 2007.

Final Office Action Summary from U.S. Appl. No. 11/216,615 mailed on Jul. 19, 2007.

Office Action Summary from U.S. Appl. No. 11/216,615 mailed on Jan. 17, 2008.

Final Office Action Summary from U.S. Appl. No. 11/216,615 mailed on Jun. 20, 2008.

Notice of Allowance from U.S. Appl. No. 11/216,615 mailed on Aug. 25, 2008.

Office Action Summary from U.S. Appl. No. 11/694,091 mailed on Oct. 15, 2007.

Office Action Summary from U.S. Appl. No. 11/694,091 mailed on Mar. 24, 2008.

Notice of Allowance from U.S. Appl. No. 11/694,091 mailed on May 16, 2008.

* cited by examiner

METHOD FOR READING DATA FROM A MAGNETIC RECORDIGN TAPE

RELATED APPLICATIONS

This application is a continuation of U.S. patent application Ser. No. 11/216,615 to Czarnecki et al., filed Aug. 30, 2005 now U.S. Pat. No. 7,474,488, and which is herein incorporated by reference.

This application is related to U.S. patent application Ser. No. 11/215,602 to Berman et al., entitled "System and Method for Deconvolution of Multiple Data Tracks" filed Aug. 30, 2005, and which is herein incorporated by reference.

FIELD OF THE INVENTION

The present invention relates to tape drive heads, and more particularly, this invention relates to a write and read device array where widths of the read devices are smaller than widths of the write devices or data tracks.

BACKGROUND OF THE INVENTION

Data is stored on magnetic media such as tape by writing data in a multiplicity of linear tracks. The tracks are separated along the transverse direction of the tape and a given track runs longitudinally along the tape.

In order to increase the amount of data that can be written for a given tape width, efforts have been made to make data tracks adjacent one another. The most common method for writing is to use writers that are spaced apart by a predetermined distance. During writing, several tracks are written simultaneously, with a gap positioned between each track and the tracks adjacent thereto. Then, when writing in the opposite direction, the head steps to one side and writes additional tracks, overlapping the previous tracks by a certain amount (called "shingling").

The reader is typically slightly smaller than the writer, is aligned therewith, and is reading one single track. This is called "write wide, read narrow." Because the reader is narrower than the writer, the reader will tend not to read adjacent tracks in spite of the "wobble" of the tape relative to the reader as the tape moves across the head.

FIG. 1 illustrates a typical multitrack tape head 100 having a multitude of read elements 102 and write elements 104, where the read elements 102 are aligned with the write elements 104. Servo elements 106 (one shown) flank the read elements 102 and are used to sense servo tracks on the medium to keep the head 100 aligned over a data track during reading/writing.

A major drawback to this traditional "shingling" method, however, is that wobble increases the probability of overwriting adjacent data tracks during writing the reverse direction. As the track width decreases, the amount of wobble (or track mis-registration) needs to decrease proportionally. As the track width is decreasing with future generations, it is becoming more difficult to decrease the track mis-registration sufficiently to avoid overlap of readers on multiple written tracks.

One solution calls for writing adjacent data tracks in the same direction. Writers positioned adjacent each other simultaneously write multiple tracks. An advantage of this type of system is that the chance of overwriting data tracks due to wobble is eliminated for the group of simultaneously written adjacent tracks. Further, because all tracks are written simultaneously, as the tape wobbles, all tracks follow the same wobble.

Simultaneous data tracks work well if the head can precisely position its readers over each data track. However, servo tracks are typically written to the tape prior to writing any data. So, during readback, even though the head is following the servo tracks, errors occur due to wobble of the written data tracks and the inherent wobble during readback, and may even be exacerbated by a wobbly servo track. The errors can result in a particular reader reading two or more tracks simultaneously, especially where track spacing is minimal or overlapping. The resultant signal is noisy and may make extraction of the data impossible.

To resolve this problem and provide other advantages, the embodiments of the invention disclosed herein proposes providing multiple readers per data track, where the readers have less than half the width of the writers or data track width.

SUMMARY OF THE INVENTION

A method for reading data from a magnetic recording tape having multiple adjacent data tracks according to one embodiment includes simultaneously detecting signals from a plurality of read devices, at least some of the read devices being positioned over multiple data tracks while other of the adjacent read devices are positioned over single data tracks; determining which of the read devices is positioned over a single data track; and simultaneously reading data from the data tracks using only those read devices over the single data tracks.

A method for reading and writing data to a magnetic recording tape having multiple adjacent data tracks according to another embodiment includes simultaneously writing data tracks to a magnetic medium; and simultaneously reading the data tracks on the magnetic medium using a plurality of adjacent read devices; wherein the number of the adjacent read devices is at least twice the number of the adjacent write devices.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Figure 1:
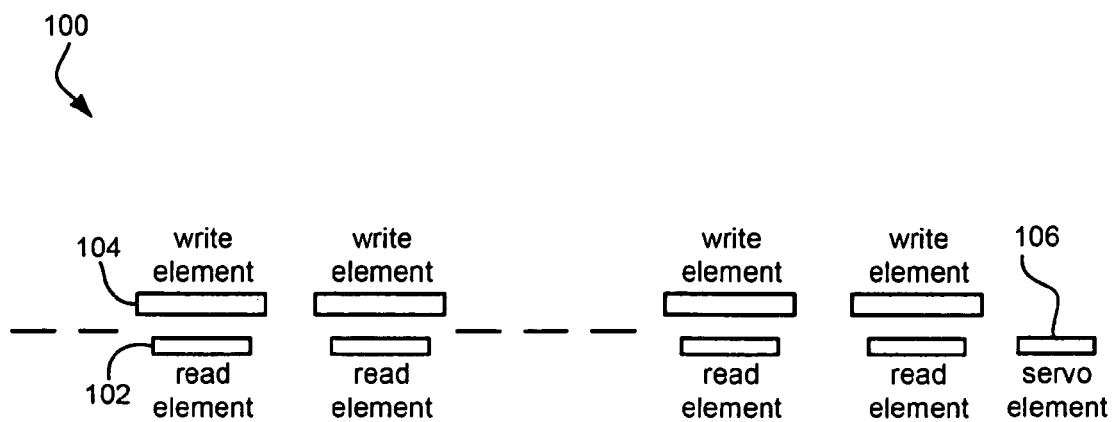
FIG. 1 is a representative view of a typical prior art multitrack tape head having a multitude of read and write elements as seen from the tape bearing surface.
Figure 2:
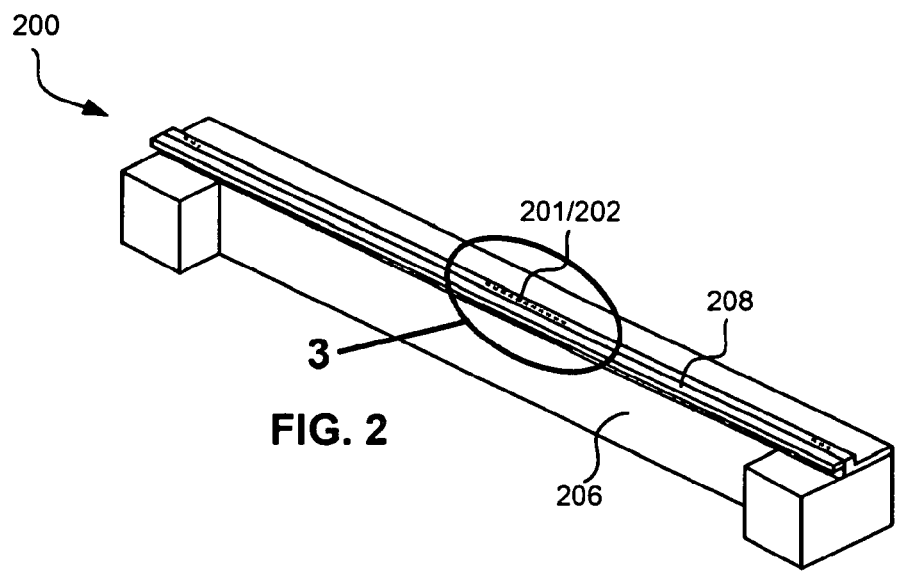
FIG. 2 illustrates a module portion of a tape head.

FIG. 2 illustrates a module 200 carrying multiple read devices (also called readers, sensors, read elements, etc.) and write devices (also called writers, write elements, etc.). As shown, the write devices 201 and read devices 202 are positioned towards the middle of the module 200. In order to increase the stability of the module 200 for the suitable use thereof, the module 200 is attached to a beam 206 of some sort formed of a rigid material. Such beams 206 are often referred to as a "U-beam." A closure 208 is often attached in view of the benefits it affords in resultant heads.

Figure 3:
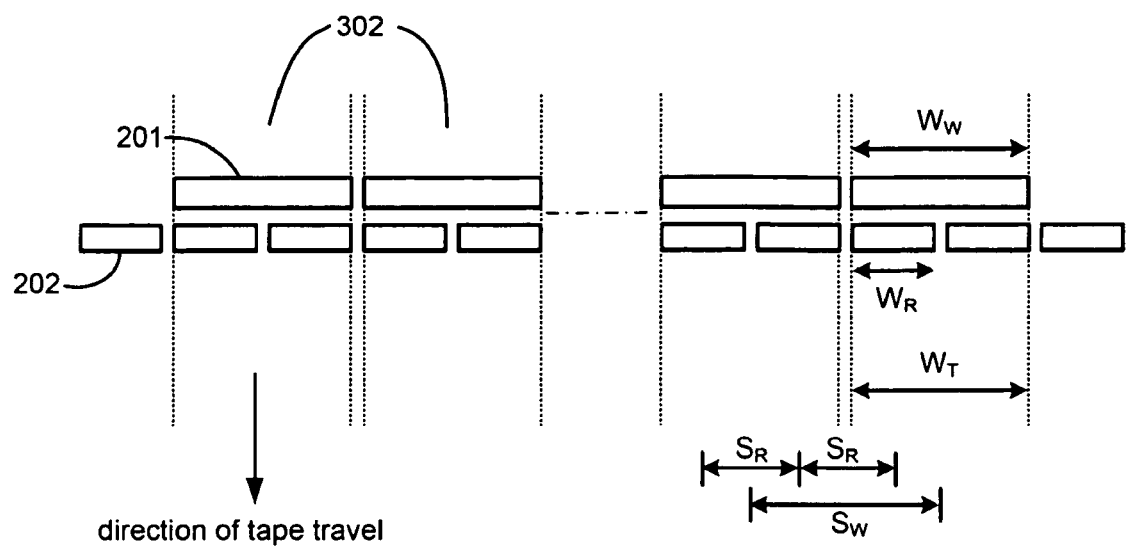
FIG. 3 is a representative view of the read and write elements of the module of FIG. 2 taken from Circle 3 of FIG. 2 and as seen from the tape bearing surface.

FIG. 3 is a representative view of the read devices 202 and write devices 201 of the module 200 according to one embodiment of the present invention. As shown, the width ($W_R$) of the read devices 202 is much less than the width ($W_W$) of the write devices 201 and consequently the width ($W_T$) of the written track 302 (shown in dotted lines to represent the width of data tracks on the tape). For example, the width ($W_R$) of the read devices is preferably half or less than half of $W_W$. The spacing ($S_R$) between centerpoints of the read devices 202 is significantly less than the spacing ($S_W$) between centerpoints of the write devices 201 as measured in a direction transverse to the direction of tape travel. Also, note that more read devices 202 are present than write devices 201. The importance of these aspects will be discussed in more detail below, and are described here with reference to the drawings to provide context to the concepts.

One skilled in the art will appreciate that the configuration of write and/or read devices 201, 202 can vary. Particular examples include interleaved configurations where the read and write devices 201, 202 alternate, piggybacked configurations where the read and write devices 201, 202 are formed one above the other on the same substrate in the tape travel direction, etc.

Figure 4:
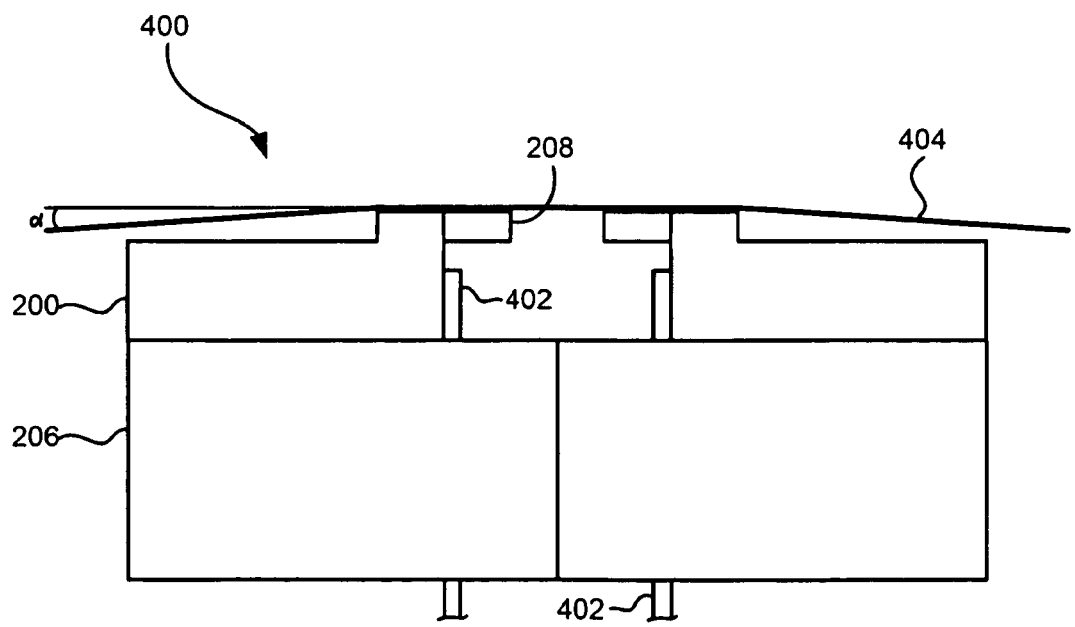
FIG. 4 illustrates a head for a read-while-write bidirectional linear tape drive in use.

FIG. 4 illustrates a head 400 for a read-while-write bidirectional linear tape drive in use. "Read-while-write" means that the read element follows behind the write element. This arrangement allows the data just written by the write element to be immediately checked for accuracy and true recording by the following read element.

The head 400 of FIG. 4 is formed by coupling two modules 200 of the type shown in FIG. 2. Specifically, in FIG. 4, two modules 200 are mounted on U-beams 206 which are, in turn, adhesively coupled. Cables 402 are fixedly coupled to pads in communication with the read and write devices 201, 202 (FIG. 2). The tape 404 wraps over the modules 200 at a predetermined wrap angle α.

It should be noted that the two-module tape head 400 of FIG. 4 is representative only, as the precepts of the present invention can be implemented in any type of head where multiple tracks of information can be written and subsequently read.

One skilled in the art will appreciate that the configuration of write and/or read devices 201, 202 can vary. For instance, one module can have all write devices 201, while the other module can have all read devices 202. Another example would be to have a plurality of write devices 201 and read devices 202 all aligned linearly perpendicular to the direction of tape movement. It should also be understood that the number of read and write devices described herein are provided by way of example only, and can be increased or decreased per the desires of the designer, system requirements and capabilities, etc.

Another variation includes a head having only a single module of read and write devices that provides all of the read/write functionality. Of course the shape of the module may be different than the module 200 shown in FIG. 2. One skilled in the art will appreciate how to create a single module design using traditional head designs.

Figure 5:
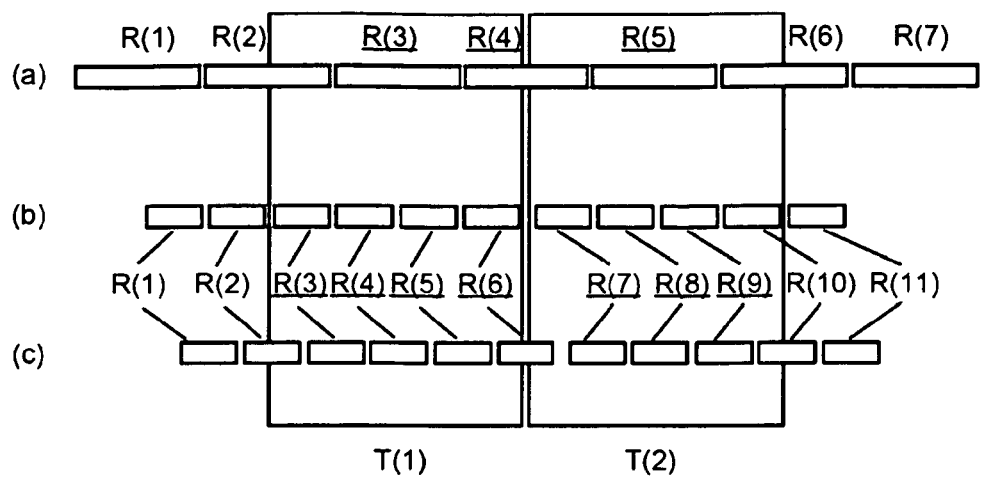
FIG. 5 is a simplified schematic of multiple read devices which overlap written tracks on a magnetic recording tape.

According to a preferred embodiment, a multiplicity of data patterns or "tracks" are written onto a medium, such as a magnetic recording tape, using a multiplicity of adjacent write devices with a width $W_W$. The signals are then read by a multiplicity of read devices whose width ($W_R$) is half or less than half of $W_W$. A given embodiment includes multiple read devices R(1), R(2), . . . , R($N_R$), where $N_R$ is the number of readers which overlap written tracks T(1), T(2), . . . , T($N_W$), where $N_W$ is the number of writers) on a magnetic recording tape where $W_R$ is less than or equal to half of $W_W$. Two illustrative embodiments are shown in FIG. 5. In the embodiment of scenario (a), $S_R=S_W/2$ with $W_R \leq W_W/2$. In the embodiment of scenarios (b) and (c), $S_R=S_W/4$ with $W_R \leq W_W/4$.

In scenario (a) where $S_R=S_W/2$, a simple algorithm is to keep only the signals which are on a single given track. In scenario (a) shown for $W_R=W_W/2$, read devices R(3) and R(5) would be maintained and would be associated with written tracks T(1) and T(2) respectively. In practice, it might be best to have $W_R$ be slightly less than $W_W/2$, with $S_R=S_W/2$. The choice of which read devices to use can be determined by the lack of signal on the outer read devices (assuming no data written outside the tracks T). R(1) and R(7) would not register a pattern, while R(2), R(3), R(4), R(5), and R(6) would register a signal. Because the system knows that if R(1) and R(7) do not register a pattern, R(3) and R(5) must be on the data track based on the dimensions of the data tracks and head, the signal from R(3) and R(5) is used and the signal from R(2), R(4), and R(6) can simply be discarded. Note that the signals from R(2) and R(6), though partial, could also be used to enhance the signal if desired. Similarly, if R(1) and R(2) do not register a pattern, and R(7) registers a pattern (e.g., due to wobble), the system can still determine which read devices are over the tracks and can, for instance, then use the signal from R(4) and R(6) to read T(1) and T(2). The system can also note the offset and adjust the position of the head so that the read devices are once again positioned as shown in scenario (a) of FIG. 5.

Scenarios (b) and (c) of FIG. 5 depict the case where $S_R=S_W/4$ with $W_R \leq W_W/4$. In practice, it might be best to have $W_R$ be slightly less than $W_W/4$, but to have $S_R=S_W/4$. In scenario (b), no signals will be detected on read devices R(1), R(2) or R(11) so R(3) to R(6) would be associated with T(1) and R(7) to R(10) would be associated with T(2). This method of deconvoluting the read signals would enable unambiguous determination of the signals from a given written track. In scenario (c), the system will detect no signal from R(1) and R(11), but a partial signal from R(2) and R(10). Accordingly, the system will use the signal from R(3) to R(5) to read T(1) and R(7) to R(9) to read T(2). The read signals which come from an overlap of the two tracks (R(4) from scenario (a), and R(6) from scenario (c)) could also be used by extending the concept given in the copending application incorporated by reference herein.

While this example shows only two written data tracks and a small number of read devices, one skilled in the art will appreciate that many more data tracks, read devices, etc. may be present in a particular system.

The determination of which read device to use for a given track can be made at least in part by using the signal intensities read from one or more guide bands adjacent a group of data tracks. Because the position of the guide bands is known with respect to the data tracks, the system can determine which read devices are over a guide band and which readers are over which data tracks. A simple way to create the guide band, and the preferred method, is to do a DC erase while writing. A DC erase essentially creates a "dead" region which produces no signal during readback. Any read device over the DC erased guide band will produce no signal. Another option to create the guide band is to write a monotone or fundamental harmonic instead of the DC erase. A reader producing a signal corresponding to the monotone or fundamental harmonic will then be known to be at least partially over the guide band. A further method is to use an AC erase. One skilled in the art will appreciate the many ways that guide bands can be added to the tape.

When the system is set up properly according to the preferred embodiment, there will always be a read device in the guide band on either side of the data group. And because the width $W_R$ of the read device is equal to or less than one half the width $W_W$ of the write device or data track width $W_T$, one read device will always be entirely on a particular data track even if other read devices overlap two tracks.

During reading, the read devices over the guide band will get no signal at all (if dead band), or will detect the harmonic or other pattern. The inner read devices will, however, produce data signals.

Figure 6:
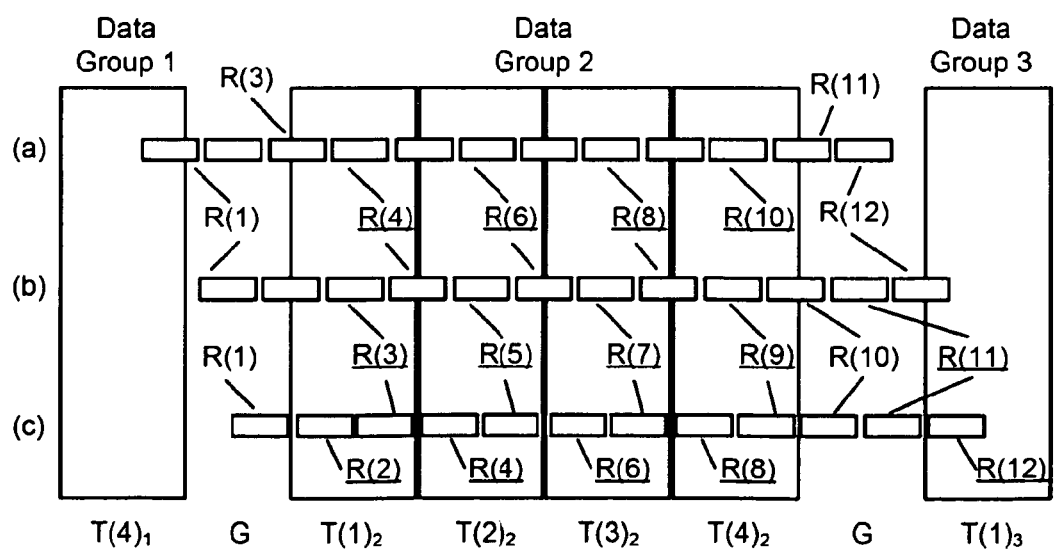
FIG. 6 is a simplified schematic of multiple read devices which overlap written tracks on a magnetic recording tape.

FIG. 6 illustrates an example of three adjacent groups of written tracks T. In this example, each group has four written tracks. A "dead" guard band G is positioned between each group of written tracks. All tracks within a given group are written simultaneously by four adjacent write devices. An illustrative write device array would have six write devices, four for data and two to write the guide bands for a particular data group. Flanking guide band write devices is the most reliable, particularly where the tape has been previously written to. The array could also implement only one write device to generate one guard band, thus relying on the guard band created by the next pass of writing to avoid overlapping previously written tracks. The width of the guard band writer(s) might be chosen to be larger than the track writers.

In the example of FIG. 6, $S_R=S_W/2$ with $W_R \leq W_W/2$. Also, the number of read devices R in this example is 12, which is twice the number of write devices mentioned in the previous paragraph, and three times the number of write devices that write the data tracks. By having more than twice the number of read devices as write devices, at least one read device will be over the guard band at any given time. In scenario (a) of FIG. 6, read devices R(4), R(6), R(8) and R(10) are associated with tracks T(1) to T(4) respectively for written Data Group 2. The determination of which read device should be associated with which write device is made by noting that R(2) and R(12) have no signals and R(1), R(3) and R(11) have partial signals.

In scenario (b) of FIG. 6, read devices R(3), R(5), R(7) and R(9) are associated with tracks T(1) to T(4) respectively for written Data Group 2. The determination of which read device should be associated with which write device is made by noting that R(1) and R(11) have no signals and R(2), R(10) and R(12) have partial signals.

In scenario (c) of FIG. 6, read devices R(2) and R(3) are associated with track T(1), R(4) and R(5) are associated with track T(2), R(6) and R(7) are associated with track T(3), and R(8) and R(9) are associated with track T(4) for written Data Group 2. The determination of which read device should be associated with which write device is made by noting that R(1), R(10), and R(11) have no signals and R(12) has partial signals.

The guide band may be the same size as the data tracks, but does not necessarily need to be. The choice of the width of the guard band between groups of written tracks where no signals are written will need to be carefully chosen. Decisions on the choice of the read device width, read device spacing, and the width of the guard band must be made which include considerations such as (1) optimizing the data density; (2) optimizing the signal-to-noise ratio (SNR); (3) how well the drive can maintain the alignment of the positioning of the read devices with the written tracks; (4) ease of implementation in the drive constraints of data processing; and (5) ability to handle the signal output to the drive.

One practicing the invention should also be careful to not allow the write device creating the guide band to overlap an already-written data track by too much. Thus, it may be desirable to space the guide band in a subsequent data group slightly away from the nearest data track of a prior-written data group.

As mentioned above, during reading of the media, the overall system receives a data signal from the read devices. Besides using the instantaneous read signal, a running average of the signal changes can be used to determine which of the read devices are entirely on a track, and which are not. The following signals are possible:

read devices in guide band will get no signal (assuming dead area)

read devices on track will get data signal read devices partially over data track and guide band will have partial data signal read devices over two data tracks will have signal representing the two tracks From some or all of this data, the system can determine which read device(s) are entirely on a particular track. The system can then use signal from the read device(s) which are on the track and discard the remaining signals. For instance, signals from read devices over two tracks may be discarded. Alternatively, the signal from each track may be deconvoluted as described in the US patent application entitled "System and Method for Deconvolution of Multiple Data Tracks" which has been incorporated by reference above.

Figure 7:
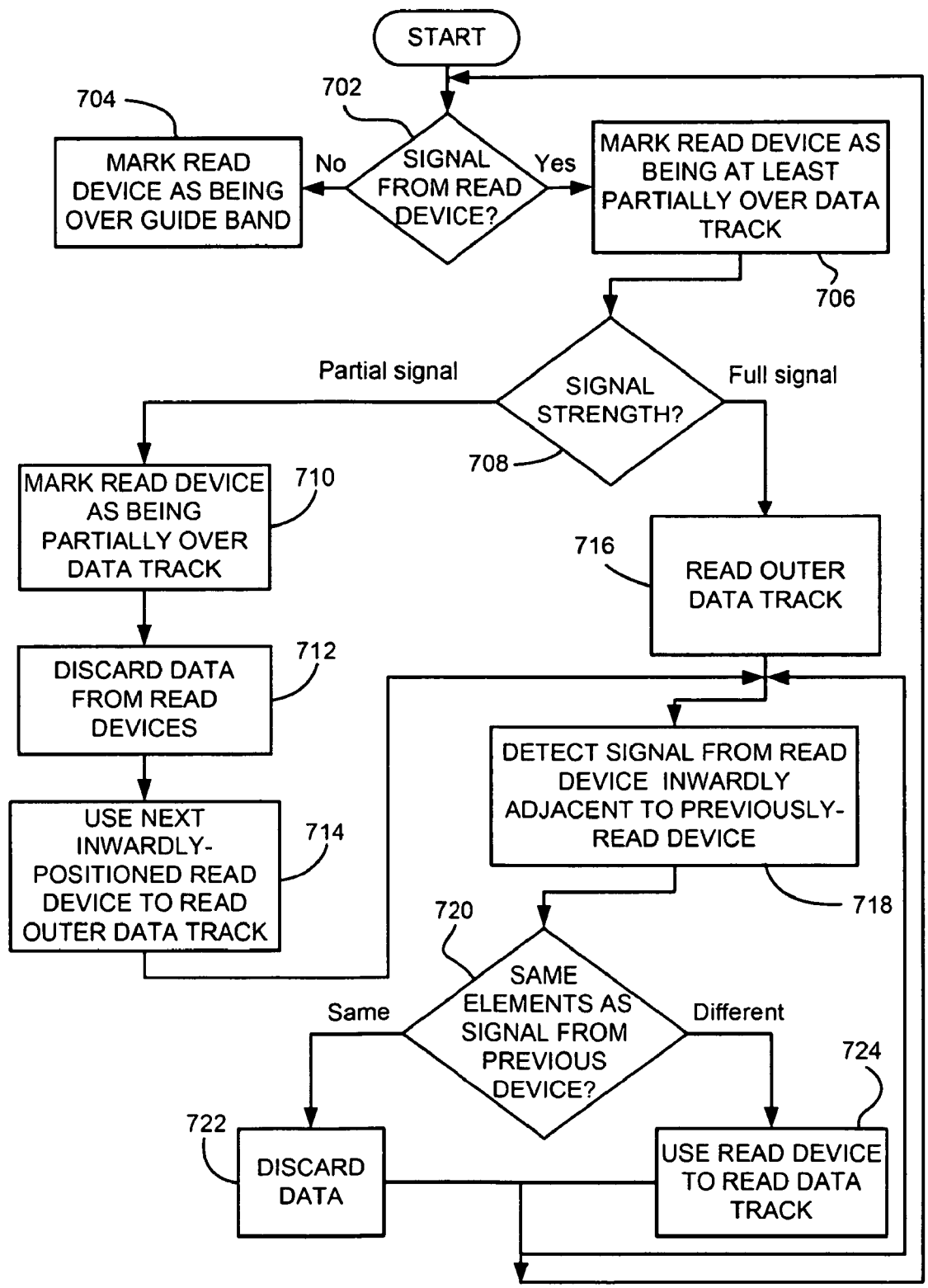
FIG. 7 is a process diagram of a method for selecting read devices according to one embodiment.

FIG. 7 depicts a process 700 for selecting which read devices to use to read data tracks. The following illustrative process assumes read device widths are equal to or slightly less than one half the width of the data track, a read element which is positioned over only the guide band yields no signal other than noise. The process analyzes the read devices from the outside position in based on their readback signal.

At decision 702, the read devices are sensed for a signal. If no signal is detected, the read device(s) are marked as being on a guide band in operation 704. Thus, alternate readers will be on track. If reader n is on the first guide band, readers n+2m (n and m are integers) will be on track m. In operation 706, all other read devices are marked as at least partially over data tracks.

At decision 708, the signal from the read device(s) innerly adjacent to the read device(s) over the guide band are analyzed for full signal strength. If a partial signal is detected, the read device is marked as partially on a data track and partially over a guide band in operation 710. In operation 712, the data is discarded, and in operation 714, the signal from the next read device innerly adjacent thereto is used to read data from the outer data bands. If a full data signal (or above a predetermined threshold) is found, then the signal can be used to read data from the outer data tracks. See operation 716.

In operation 718, the signal from the read device innerly adjacent to the previously-read read device is detected. At decision 720, the signal from the read device is compared to the previously-read read device. In operation 722, if a partial signal is found that includes elements that are the same as the signal from the previously-read read device and elements that are different than the signal from the previously-read read device, the signal is discarded because the read device is over two tracks. If the signals are different, the signal is used to read data from the data track in operation 724. [Note that this also works for embodiments where more than one read device will fit within a given track width. In the case where two read devices are entirely over a single data track, the first read device signal analyzed will be used, and the signal from the second device can be discarded.]

Operations 718-724 are repeated for each read device. The entire process should be repeated at least periodically to account for any wobble.

One skilled in the art will appreciate that other processes can be used to determine the positioning of the read devices. For instance, consider the following example assuming no expansion and contraction of the tape, $W_R=W_W/2$, and all readers are read simultaneously. Each of the readers are grouped into odd or even groups. If an odd guide reader is positioned over a guide band, the output from the odd readers can be used to read the data tracks. Likewise, if an even guide reader is positioned over a guide band, the even readers can be used to read the data tracks. This is a very simple example, but functions adequately.

Again, one skilled in the art will appreciate that more complex schemes can be employed, and may be desirable. Because of dropouts (where signals decrease due to imperfections in the tape magnetic coatings) more complicated schemes can be employed which utilize the signal levels from all readers. Scenario (a) of FIG. 6 can be used for illustration. R(2) and R(12) will give no signal. R(3) and R(11) will provide partial signals and R(4) through R(10) should give full signals. Thus, R(4+2m) where (m=1 to 4) will be on tracks m (1 to 4) respectively. Because of imperfections in the tape magnetic coating, the signals from one or more of the readers R(3) through R(11) may be weaker than expected or may be low at that time point due to the lack of a transition at that time point. Using die running average information of reader-to-track location, the total width of the written track can greatly improve the reader-to-track correspondence.

One skilled in the art will also appreciate that read device selection can be done via integration, and even instantaneously. The particular method to select active read devices will, of course, depend on the configuration of the system in which implemented.

One practicing the invention and creating a new process should also keep in mind that the data group will always be spaced the same distance from the guide band, as long as the guide band is written concurrently with the data tracks. Once it is known that a read device is positioned over a guide band, the positions of the other read devices relative to the guide band and data tracks can be readily determined. Accordingly, a simpler process would be to merely detect which read device(s) are over the guide band, and then determine the positions of the remaining read devices, and/or select from which read devices to use signal, based on the expected boundaries of the data tracks relative to the guide band. Deformation of the tape due to creep from use or age or expansion and contraction from temperature or humidity changes could change the width of previously written tracks. If the number of tracks in a group ($N_G$) is large and the and the tape expands sufficiently, it is possible that a more complicated algorithm than using alternate readers would be necessary to determine the reader-to-written track correlation. A person skilled in the art will make the necessary adjustments.

The selection process to determine which heads to take signal from should be continuously performed, at least with respect to determining which read devices are fully and/or partially over the guide bands, to account for wobble.

As mentioned above, because the read device width is equal to or less than one half the width of the write device or data track, one read device will always be entirely on a particular data track even if other read devices overlap two tracks. Moreover, if the read devices are one third the width of the write device or track width, then two read devices will always be positioned over a particular data track. If the read devices are one fourth the width of the write device or track width, then three read devices will always be positioned over a particular data track. Accordingly, reducing the width of the read devices allows for more read devices to be positioned over a single data track, and thus, higher resolution.

An additional benefit of the system and method is that by using multiple read devices having narrow widths, the system can read tapes created by various write devices having different write device widths. For instance, the system can read not only data from a tape written by a drive from manufacturer A having write devices of width X, but also a tape written by a drive from manufacturer B having write devices a fraction or multiple of width X (e.g., 0.65X or 2X). The system would have enough read devices present to read each track in a particular data group on the tape, as well as identify a guard band (or equivalent) from which to make the determination of which read devices are on a particular track. If the guard band is a "dead" zone, the determination would be relatively easy. If the guard band is a servo pattern, the particular servo pattern used by manufacturer A or B may need to be loaded into the system. Also, information relating to the number of tracks per data group, how data is encoded when written on the tape, etc. can be loaded for a particular manufacturer or format.

Figure 8:
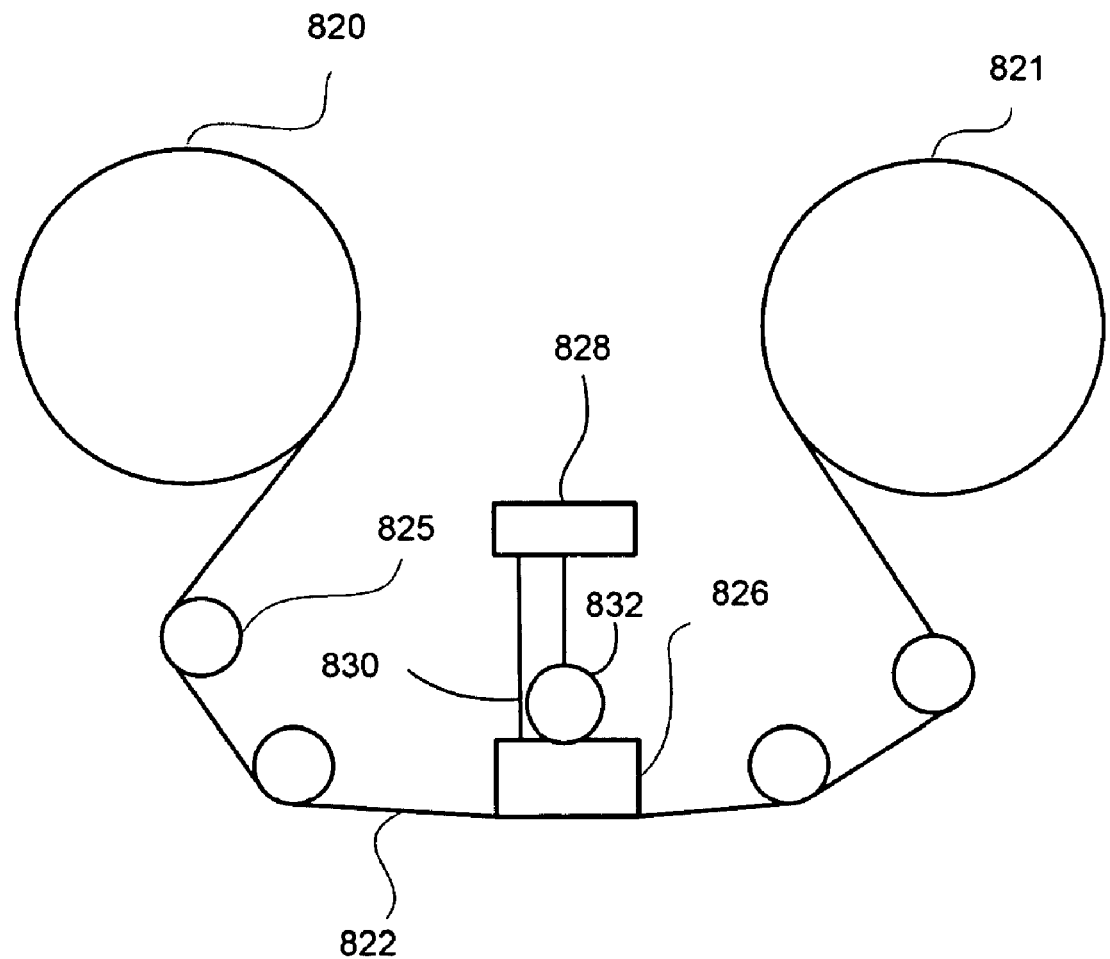
FIG. 8 illustrates a tape drive which may be employed in the context of the method of FIG. 7.

FIG. 8 illustrates a tape drive which may be employed in the context of the method 700 of FIG. 7. While one specific implementation of a tape drive is shown in FIG. 8, it should be noted that the embodiments of the previous figures may be implemented in the context of any type of drive (i.e. hard drive, tape drive, etc.)

As shown, a tape supply cartridge 820 and a take-up reel 821 are provided to support a tape 822. Moreover, guides 825 guide the tape 822 across a bidirectional tape head 826. Such bidirectional tape head 826 is in turn coupled to a controller assembly 828 via a compression-type MR connector cable 830. The actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host to send and receive the data and for controlling the operation of the tape drive and communicating the status of the tape drive to the host, all as understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for reading data from a magnetic recording tape having multiple adjacent data tracks, the method comprising:
    simultaneously detecting signals from a plurality of read devices, at least some of the read devices being positioned over multiple data tracks while other of the adjacent read devices are positioned over single data tracks;
    determining which of the read devices is positioned over a single data track; and
    simultaneously reading data from the data tracks using only those read devices over the single data tracks.

2. A method as recited in claim 1, further comprising determining which of the read devices is positioned over a guide band, wherein the determination of which of the read devices is positioned over one of the data tracks is based at least in part on the position of the read devices relative to the guide band.

3. A method as recited in claim 1, wherein a width of each of the read devices is less than or equal to one half a width of the data tracks.

4. A method as recited in claim 1, wherein the number of read devices is more than twice the number of write devices.

5. A method as recited in claim 1, wherein a spacing between centerpoints of the read devices is less than or equal to one half a spacing between centerpoints of the write devices.

6. A method for reading and writing data to a magnetic recording tape having multiple adjacent data tracks, the method comprising:
    simultaneously writing data tracks to a magnetic medium; and
    simultaneously reading data tracks on the magnetic medium using a plurality of adjacent read devices;
    wherein the number of the adjacent read devices is at least twice the number of the adjacent write devices.

7. A method as recited in claim 6, further comprising determining which of the read devices is positioned over a guide band, wherein the determination of which of the read devices is positioned over one of the data tracks is based at least in part on the position of the read devices relative to the guide band.

8. A method as recited in claim 6, wherein a width of each of the read devices is less than or equal to one half a width of the data tracks.

9. A method as recited in claim 6, wherein the number of read devices is more than twice the number of write devices.

10. A method as recited in claim 6, wherein a spacing between centerpoints of the read devices is less than or equal to one half a spacing between centerpoints of the write devices.

11. A method as recited in claim 6, wherein the adjacent read devices are aligned along a straight line.

* * * * *